(12) United States Patent
Okamura et al.

(10) Patent No.: US 7,659,524 B2
(45) Date of Patent: Feb. 9, 2010

(54) RADIATION IMAGE CONVERSION PANEL AND PREPARATION METHOD THEREOF

(75) Inventors: Shinichi Okamura, Tokyo (JP); Takafumi Yanagita, Tokyo (JP)

(73) Assignee: Konica Minolta Medical & Graphics, Inc. (JP)

( * ) Notice: Subject to any disclaimer, the term of this patent is extended or adjusted under 35 U.S.C. 154(b) by 0 days.

(21) Appl. No.: 12/166,682

(22) Filed: Jul. 2, 2008

(65) Prior Publication Data

US 2009/0008574 A1 Jan. 8, 2009

(30) Foreign Application Priority Data

Jul. 5, 2007 (JP) ............... 2007-177157

(51) Int. Cl.
*H05B 33/00* (2006.01)
(52) U.S. Cl. .................................. 250/484.4
(58) Field of Classification Search ............... 250/484.4
See application file for complete search history.

(56) References Cited

U.S. PATENT DOCUMENTS 3,859,527 A 1/1975 Luckey

2004/0188632 A1* 9/2004 Neriishi et al. ........... 250/484.4
2006/0219942 A1* 10/2006 Takasu ..................... 250/484.4

FOREIGN PATENT DOCUMENTS

| JP | 55-12144 A | 1/1980 |
|----|------------|--------|
| JP | 61-142497 A | 6/1986 |
| JP | 61-142500 A | 6/1986 |
| JP | 62-39737 A | 2/1987 |
| JP | 62-110200 A | 5/1987 |
| JP | 2-58000 A | 2/1990 |
| JP | 2004-170405 A | 6/2004 |
| JP | 2004-233134 A | 8/2004 |

* cited by examiner

*Primary Examiner*—David P Porta
*Assistant Examiner*—Kiho Kim
(74) *Attorney, Agent, or Firm*—Cantor Colburn LLP

(57) ABSTRACT

A method of preparing a radiation image conversion panel including a substrate and a phosphor layer, may include heating an evaporation source containing a phosphor raw material to evaporate the raw material and depositing an evaporated material on the substrate to form the phosphor layer, while the substrate being heated, wherein in (ii), a temperature of the substrate increases at a rate of 0 to 5° C./min, and falling within a range of from 60 to 110° C.

10 Claims, No Drawings

RADIATION IMAGE CONVERSION PANEL AND PREPARATION METHOD THEREOF

This application claims priority from Japanese Patent Application No. JP2007-177157 filed on Jul. 5, 2007, which is incorporated hereinto by reference.

FIELD OF THE INVENTION

The present invention relates to a radiation image conversion panel using a phosphor and a preparation method thereof.

BACKGROUND OF THE INVENTION

Radiographic images such as X-ray images are employed in many fields, for example, for use in diagnosis of an illness. There have been employed, as a method for obtaining X-ray images, so-called radiation photography systems in which X-rays which have passed through a photographic subject are irradiated onto a phosphor layer (fluorescent screen) to form a visible light, which is irradiated onto a silver halide photographic material (hereinafter, also denoted simply as a photographic material) similarly to conventional photography, followed by being subjected to photographic processing to obtain a visible silver image.

Recently, there was developed a new method for obtaining an image directly from a phosphor layer in place of an image forming method by use of silver halide photographic materials. In such a method, radiation having passed through a subject is absorbed by a phosphor and then, the phosphor is excited by light or heat energy, whereby a radiation energy accumulated in the phosphor through absorption is radiated as fluorescence and this fluorescence is detected to form an image.

Specifically, there is known a radiation image conversion method by use of photostimulable phosphors, as described in, for example, U.S. Pat. No. 3,859,527 and JP-A No. 55-12144 (hereinafter, the term JP-A refers to Japanese Patent Application Publication). In this method is used a radiation image conversion panel having a phosphor layer containing a photostimulable phosphor. Radiation having passed through a subject is irradiated onto the photostimulable phosphor layer, in which radiation energy corresponding to radiation transmission densities of the individual portions of the subject is accumulated, thereafter, the photostimulable phosphor is excited in time series by an electromagnetic wave (exciting light) such as a visible ray or an infrared ray, whereby the radiation energy accumulated in the photostimulable phosphor is emitted in the form of a stimulated emission. Signals due to the thus emitted light are, for example, photoelectrically converted to obtain electric signals. The thus obtained electric signals are reproduced as a visible image on a recording material such as a photosensitive material or on a display such as a CRT.

The foregoing radiation image reproduction posesses an the advantage that a radiation image with extensive information is obtained by much less radiation exposure, compared to conventional radiography of the combination of a conventional radiographic film and an intensifying screen.

Such a radiation image conversion panel using a photostimulable phosphor accumulates radiation image data and emits accumulated energy by scanning with an exciting light, so that accumulation of radiation images is again feasible after scanning, enabling repeated use. Thus, conventional radiography consumes radiographic films for every photographing but on the contrary, the radiation image conversion method, which repeatedly uses a radiation image conversion panel, is advantageous in terms of resource protection and economical efficiency.

Further, recent diagnostic image analysis requires a radiation image conversion panel of further enhanced sharpness. There were attempted means for improving sharpness, for example, controlling the shape of the formed photostimulable phosphor particles to achieve improvement in sensitivity and sharpness.

Such attempts included, for example, a method of using a photostimulable phosphor layer formed of fine pseudo-columnar blocks deposited on a support having a finely concaved pattern, as described in JP-A No. 61-142497.

There were also proposed the use of a radiation image conversion panel having a photostimulable phosphor layer in which cracks between columnar blocks obtained by depositing a photostimulable phosphor on a support having a micropattern were further developed by being subjected to a shock treatment, as described in JP-A No. 61-142500; the use of a radiation image conversion panel in which cracking is caused on the surface of a photostimulable phosphor layer formed on a support to form pseudo-columns, as described, for example, in JP-A No. 62-39737; and a method in which a photostimulable phosphor layer having voids is formed on the support surface through vapor deposition and then subjected to a heat treatment to grow the voids to form cracks, as described in, for example, JP-A No. 62-110200.

There was also proposed a radiation image conversion panel having, on a support, a photostimulable phosphor layer formed of finely long columnar crystals exhibiting a given inclination to the vertical line of the support, as described in, for example, JP-A No. 2-58000.

Recently, there was proposed a radiation image conversion panel using a Eu-activated photostimulable phosphor comprised of an alkali halide such as CsBr as a parent material. Specifically, the use of Eu as an activator enabled to render it feasible to achieve enhanced X-ray conversion efficiency which was never realized before.

There is also known a technique intending to enhance sensitivity in which at least one vaporization source containing a phosphor parent component and an activator component of EuOX or a mixture of EuOX and $EuX_m$ was vaporized under an atmosphere having a prescribed oxygen partial pressure, as described in, for example, JP-A No. 2004-233134.

JP-A No. 2004-170405 disclosed a prescribed relational expression of a molar ratio of europium/cesium and a substrate temperature during deposition as a condition for preparation of a radiation image conversion panel of high sensitivity but was silent with respect to temperature variation rate of the substrate.

SUMMARY OF THE INVENTION

The present invention has come into being in view of the foregoing situation and it is an object of the invention to provide a radiation image conversion panel exhibiting enhanced luminance and superior image sharpness and a preparation method of the same.

The foregoing problems related to the invention can be overcome by the following constitution.

Thus, one aspect of the invention is directed to a method of preparing a radiation image conversion panel comprising heating an evaporation source containing a phosphor raw material and allowing an evaporated material to deposit on a substrate to form a phosphor layer, wherein the substrate is heated during deposition, and the temperature of the substrate during deposition falls within a range of from 60 to 110° C.

and increases at a rate of 0 to 5° C./min from a temperature of the substrate at the time of starting deposition to an attained maximum temperature during deposition.

Another aspect of the invention is directed to a radiation image conversion panel comprising on a substrate a phosphor layer, wherein the panel is prepared by the foregoing method.

According to the above-described means of the invention, there can be provided a radiation image conversion panel exhibiting enhanced luminance and superior image sharpness and the preparation method thereof.

DETAILED DESCRIPTION OF THE INVENTION

The method of preparing a radiation image conversion panel comprises heating an evaporation source having at least one phosphor raw material and depositing an evaporated material onto the substrate to form a phosphor layer, wherein the temperature of the substrate during deposition falls within the range of from 60 to 110° C. and increases at a rate of 0 to 5° C./min from the substrate temperature at the initiation of deposition to the maximum temperature attained during evaporation. The phosphor layer preferably comprises an alkali halide phosphor that is a compound represented by the following formula (1):

$$M^1X \cdot aM^2X' \cdot bM^3X'' : eA \qquad \text{formula (1)}$$

wherein $M^1$ is at least an alkali metal atom selected from the group consisting of Li, Na, K, Rb and Cs; $M^2$ is at least a divalent metal atom selected from the group consisting of Be, Mg, Ca, Sr, Ba, Zn, Cd, Cu and Ni; $M^3$ is at least a trivalent metal atom selected from the group consisting of Sc, Y, La, Ce, Pr, Nd, Pm, Sm, Eu, Gd, Tb, Dy, ho, Er, Tm, Yb, Lu, Al, Ga and In; X, X' and X'' are each a halogen atom selected from the group consisting of F, Cl, Br and I; A is a metal atom selected from the group consisting of Eu, Tb, In, Ga, Ce, Tm, Dy, Pr, Ho, Nd, Yb, Er, Gd, Lu, Sm, Y, Tl, Na, Ag, Cu and Mg; a, b and e are values meeting the following conditions:

$$0 \leq a < 0.5 \quad 0 \leq b < 0.5 \text{ and } 0 \leq e \leq 0.2.$$

In the phosphor layer, the metal atom ratio of A to $M^1$ (expressed in molar ratio) is preferably from $1 \times 10^{-5}$ to $1 \times 10^{-3}$.

A temperature of less than 60° C. or more than 110° C. often results in a lowering of luminance, which is presumed to be due to a lowering of crystallinity of phosphor crystals formed through vapor deposition.

When a temperature rising rate from the temperature of the substrate at the start of vapor deposition until reaching the maximum temperature during vapor deposition is more than 5° C./min, a lowering of luminance or uneven luminance often results. This is presumed to be due to the fact that the substrate contracts and loosens with an abrupt temperature increase and the temperature of the loosened portion increases, resulting in a different crystal form.

There will be further described constituent elements of the invention.

Phosphor Raw Material

In the following are described compounds represented by the foregoing formula (1).

In the formula (1), $M^1$ is at least an alkali metal atom selected from the group consisting of Li, Na, K, Rb and Cs, preferably an alkali metal selected from Rb and Cs, and more preferably Cs atom.

$M^2$ is at least a divalent metal atom selected from the group consisting of Be, Mg, Ca, Sr, Ba, Zn, Cd, Cu and Ni, and of these is preferred a divalent metal atom selected from Be, Mg, Ca, Sr and Ba.

$M^3$ is at least a trivalent metal atom selected from the group consisting of Sc, Y, La, Ce, Pr, Nd, Pm, Sm, Eu, Gd, Tb, Dy, Ho, Er, Tm, Yb, Lu, Al, Ga and In, of these is preferred a trivalent metal atom selected from Y, Ce, Sm, Eu, Al, La, Gd, Lu, Ga and In.

A is a metal atom selected from the group consisting of Eu, Tb, In, Ga, Ce, Tm, Dy, Pr, Ho, Nd, Yb, Er, Gd, Lu, Sm, Y, Tl, Na, Ag, Cu and Mg.

X, X' and X'' are each a halogen atom selected from the group consisting of F, Cl, Br and I, preferably a halogen atom selected from F, Cl and Br, and more preferably a Br atom in terms of enhancement of stimulated emission luminance of the compound of formula (1).

In the formula (1), $0 \leq a < 0.5$ and preferably $0 \leq a < 0.01$, $0 \leq b < 0.5$ and preferably $0 \leq b \leq 10^{-2}$, and $0 \leq e \leq 0.2$ and preferably $0 < e \leq 0.2$.

In the formula (1), when $0 < e$ (or e is not zero), a compound itself represented by formula (1) is a phosphor and constitutes a phosphor raw material.

When $e=0$ (e is zero), specific examples of raw materials of the compound of formula (1) are cited below.

(a) There are used one or more compounds selected from NaF, NaCl, NaBr, NaI, KF, KCl, KBr, KI, RbF, RbCl, RbBr, RbI, CsF, CsCl, CsBr and CsI.

(b) There are used one or more compounds selected from $MgF_2$, $MgCl_2$, $MgBr_2$, $MgI_2$, $CaF_2$, $CaCl_2$, $CaBr_2$, $caI_2$, $SrF_2$, $SrCl_2$, $SrBr_2$, $SrI_2$, $BaF_2$, $BaCl_2$, $BaBr_2 \cdot 2H_2O$, $BaI_2$, $ZnF_2$, $ZnCl_2$, $ZnBr_2$, $ZnI_2$, $CdgF_2$, $CdCl_2$, $CdBr_2$, $CdI_2$, $CuF_2$, $CuCl_2$, $CuBr_2$, $CuI_2$, $NiF_2$, $NiCl_2$, $NiBr_2$, and $NiI_2$.

(c) There are used one or more compounds selected from $AlCl_3$, $GaBr_3$ and $InCl_3$.

When $e=0$ in formula (1), the compound of formula (1) as a phosphor raw material is used preferably in combination with the following compound (2):

Compound (2): a compound containing at least one atom selected from Eu, Tb, In, Ce, Tm, Dy, Pr, Ho, Nd, Yb, Er, Gd, Lu, Sm, Y, Tl, Na, Ag, Cu and Mg.

Such a compound (2) is preferably a europium compound. Examples of a europium compound include $EuX_2$, $EuX_3$ and EuOX (in which X is selected from F, Cl, Br and I or their combination). Of these, $EuBr_3$, $EuBr_2$, $EuCl_2$ and EuOBr led to superior results.

Substrate

There will be described a substrate used for the radiation image conversion panel of the invention.

There are employed various kinds of glasses, polymer materials and metals. Examples thereof include plate glasses of quartz, a borosilicate glass and chemically reinforced glass; organic resin films such as cellulose acetate film, polyester film, polyethylene terephthalate film, polyamide film, polyimide film, triacetate film, and polycarbonate film; and metal sheets such as an aluminum sheet, iron sheet and copper sheet or such metal sheets covered with a metal oxide. Of these, an organic resin film is preferred. When vapor deposition is performed with controlling the substrate at a temperature higher than the softening point of an organic resin film, deposited crystals penetrate into the resin film. The penetration amount can be controlled not only by the substrate temperature but also by the vapor incident rate, vapor temperature and the like. The incident rate or temperature can be controlled by temperature at the time of vaporizing the deposition raw material.

Gas Phase Growth of Phosphor

The photostimulable phosphor layer of the invention is formed through a gas phase method (also called gas phase deposition method). Examples of a gas phase method to form a photostimulable phosphor layer include a vapor deposition method, a sputtering method, a CVD method and an ion plating method.

In the invention, there are cited, for example, the following methods.

Firstly, in the vapor deposition method, a support is placed within a deposition apparatus and the inside of the apparatus is evacuated up to approximately $1.333 \times 10^{-4}$ Pa. Subsequently, at least one of the foregoing photostimulable phosphors is vaporized with heating by a method such as resistance heating method or an electron beam method to grow a photostimulable phosphor of a desired thickness on the surface of a support as described above. As a result, there is formed a photostimulable phosphor layer. The foregoing vapor deposition step may be divided into plural times to form the photostimulable phosphor layer.

Alternatively, co-deposition may be conducted using plural resistance heaters or electron beams in the vapor deposition step to perform synthesis of the targeted photostimulable phosphor, concurrently with formation of the photostimulable phosphor layer on the substrate.

After completion of deposition, a protective layer may optionally be provided on the side opposite the photostimulable phosphor layer carried by the support, whereby a radiation image conversion panel is prepared. There may also be conducted formation of a photostimulable phosphor layer on a protective layer, followed by being provided with a support.

In the vapor deposition method, the material subjected to deposition (substrate, protective layer or intermediate layer) may be cooled or heated during deposition.

Further, after completion of deposition, the photostimulable phosphor layer may be subjected to a heating treatment. Gas such as $O_2$ or $H_2$ may be introduced during the deposition stage to perform reactive deposition.

Secondly, in the sputtering method, similarly to the vapor deposition method, a substrate having a protective layer or an intermediate layer is placed in the sputtering apparatus and the inside of the apparatus is evacuated to a degree of vacuum of approximately $1.333 \times 10^{-4}$ Pa. Subsequently, an inert gas, such as Ar or Ne, used for sputtering is introduced into the sputtering apparatus and the gas pressure is maintained approximately at $1.333 \times 10^{-1}$ Pa. Then a photostimulable phosphor as a target is sputtered to grow a photostimulable phosphor layer up to the desired thickness.

Similarly to the vapor deposition method, various treatments are applicable to the sputtering method.

There are a CVD method as a third method and an ion-plating method as a fourth method.

The growth rate of a photostimulable phosphor layer in the gas phase growth described above is preferably from 0.05 to 300 μm/min in terms of productivity of a radiation image conversion panel and control of the growth rate.

When preparing a radiation image conversion panel by the above-described vacuum deposition method or sputtering method, no binder results in increased filling density of the photostimulable phosphor, whereby a radiation image conversion panel exhibiting preferable sensitivity and resolving power is achieved.

The thickness of the photostimulable phosphor layer is variable, depending on the intended use of the radiation image conversion panel and the kind of photostimulable phosphor, but the layer thickness is preferably from 50 to 1 mm, more preferably from 100 to 800 μm, and still more preferably from 100 to 700 μm.

In the preparation of a phosphor layer through the gas phase growth process, the temperature of a substrate forming thereon a phosphor layer is set to 40° C. or more, preferably 80° C. or more.

Shielding/Protective Film

A protective film, which protects the phosphor layer from moisture and inhibits deterioration of the phosphor layer, is composed of a film exhibiting a low moisture permeability. Examples of such a film include polyethylene terephthalate (PET) film. Besides PET are also usable a polyester film, polymethacrylate film, nitrocellulose film, cellulose acetate film, polypropylene film and polyethylene naphthalate film. Depending on moisture protection is usable a laminated film of plural metal oxide-deposited film sheets.

A fusing layer is provided on each of opposed faces of the substrate side and the phosphor layer side. Resin film which is fusible via an impulse sealer is usable for a fusing layer. Examples of such resin film include ethylene-vinyl acetate copolymer film, polypropylene (PP) film and polyethylene (PE) film.

An image conversion panel is sandwiched between upper and lower protective films and sealed by fusing the ends of the protective films under an atmosphere of reduced pressure.

EXAMPLES

The present invention will be further described with reference to examples but the invention is by no means limited to these.

Example 1

Preparation Of Radiation Image Conversion Panel Radiation Image Conversion Panel 1:

As a phosphor raw material were weighed 6.0 g of powdery europium oxybromide (EuOBr) and 1000 g of powdery cesium bromide (CsBr), which were mixed under an environment of 25% relative humidity. Then, the thus mixed phosphor raw materials were placed into a resistance heating crucible. Subsequently, after the inside of the deposition apparatus was evacuated, Ar gas was introduced thereinto and vacuum was adjusted to $1.0 \times 10^{-2}$ Pa, then, the substrate (1) was heated to 60° C. by a heater disposed on side of the substrate opposite the deposition surface. A phosphor was deposited at a rate of 2 μm/min with heating the resistance heating crucible to deposit a CsBr:Eu phosphor. The substrate was heated to 130° C. at a temperature-rising rate of 10° C./min from the initiation of deposition. After completion of deposition, the inside of the apparatus was returned to atmospheric pressure and the substrate was taken out of the apparatus. On an aluminum substrate was formed a phosphor layer (at a layer thickness of 150 μm) having a structure of columnar phosphor crystals being closely formed substantially in the vertical direction. From the result of ICP-MS analysis, it was proved that the molar ratio of Eu to Cs (also denoted as Eu/Cs) was $2 \times 10^{-3}$.

The thus obtained phosphor plate was covered with a moisture-resistant protective film and the circumference portion of the protective film was fused and sealed by an impulse sealer to prepare radiation image conversion panel 1.

Radiation Conversion Panels 2-6:

Radiation image conversion panel 2 was prepared similarly to the foregoing radiation image conversion panel 1, provided that the substrate was heated from 25 to 50° C. at a temperature-rising rate of 5° C./min during deposition.

Radiation conversion panels 3-6 were also prepared similarly to the radiation conversion panel 1, provided that heating conditions for the substrate and the amount europium oxybromide were controlled so that the maximum substrate temperature, the substrate temperature-rising rate during deposition and the metal element ratio of Eu to Cs (Eu/Cs) were values as shown in Table 1.

Evaluation

Radiation image conversion panels 1-6 were evaluated as below.

Sharpness:

The modulation transfer function (MTF) was determined for each of the panels and evaluated with respect to sharpness, as follows. A CTF chart was adhered to each radiation image conversion panel sample and after being exposed to 10 mR of X-rays at 80 kVp (at a distance to object of 1.5 m), the phosphor layer side A was exposed to semiconductor laser light (690 nm, power on the panel: 40 mW). The CTF chart was read by scanning with a semiconductor laser of a 100 μm diameter. Sharpness was represented by a relative value of a MTF value at 2.0 lp/mm, as shown in Table 1. A larger value is better sharpness.

Luminance:

Luminance was evaluated by using Regius 350 (produced by KONICA MINOLTA MEDICAL & GRAPHIC INC.). Similarly to the evaluation of sharpness, radiation image conversion panel samples were each exposed to X-rays in a tungsten tube bulb at 80 kVp and 10 mAs and the a distance between a radiation source and the panel plate and the plate was set within Regius 350 for reading. Evaluation was made based on electric signals obtained by phototomultiplier. Luminance was represented by a relative value, based on the luminance of radiation image conversion panel 1 being 1.0.

Evaluation results are shown in Table 1.

TABLE 1

| Radiation Image Conversion Panel No. | Max. Temperature*[1] (° C.) | Eu/Cs (molar Ratio) | Temperature-rising Rate (° C./min) | Luminance | Sharpness (%) | Remark |
|---|---|---|---|---|---|---|
| 1 | 130 | $2 \times 10^{-3}$ | 10 | 1.0 | 23 | Comp. |
| 2 | 50 | $1 \times 10^{-4}$ | 5 | 1.5 | 24 | Comp. |
| 3 | 92 | $1 \times 10^{-3}$ | 4 | 4.5 | 38 | Inv. |
| 4 | 95 | $1 \times 10^{-4}$ | 3 | 4.0 | 39 | Inv. |
| 5 | 85 | $3 \times 10^{-4}$ | 2 | 4.5 | 40 | Inv. |
| 6 | 85 | $8 \times 10^{-6}$ | 2 | 3.1 | 33 | Inv. |

*[1]Maximum temperature of a substrate during vapor deposition

As is apparent from Table 1, it was proved that radiation image conversion panels prepared according to the method of the invention exhibited superior luminance and sharpness to comparative radiation image conversion panel samples.

What is claimed is:

1. A method of preparing a radiation image conversion panel comprising a substrate and a phosphor layer, the method comprising:
   (i) heating an evaporation source containing a phosphor raw material to evaporate the raw material and
   (ii) depositing an evaporated material on the substrate to form the phosphor layer, while the substrate being heated,
   wherein in (ii), a temperature of the substrate increases at a rate of 0 to 5° C./min, and falling within a range of from 60 to 110° C.

2. The method of claim 1, wherein the phosphor layer comprises a compound represented by the following formula (1):

$$M^1X.aM^2X'.bM^3X'':eA \qquad \text{formula (1)}$$

wherein $M^1$ is an alkali metal atom selected from the group consisting of Li, Na, K, Rb and Cs; $M^2$ is a divalent metal atom selected from the group consisting of Be, Mg, Ca, Sr, Ba, Zn, Cd, Cu and Ni; $M^3$ is a trivalent metal atom selected from the group consisting of Sc, Y, La, Ce, Pr, Nd, Pm, Sm, Eu, Gd, Tb, Dy, ho, Er, Tm, Yb, Lu, Al, Ga and In; X, X' and X" are each a halogen atom selected from the group consisting of F, Cl, Br and I; A is a metal atom selected from the group consisting of Eu, Tb, In, Ga, Ce, Tm, Dy, Pr, Ho, Nd, Yb, Er, Gd, Lu, Sm, Y, Tl, Na, Ag, Cu and Mg; a, b and e are values meeting the following conditions:

$$0 \leq a < 0.5, \ 0 \leq b < 0.5, \ \text{and} \ 0 \leq e \leq 0.2.$$

3. The method of claim 2, wherein the phosphor raw material comprises a compound represented by formula (1) in which e is a value of $0 < e < 0.2$.

4. The method of claim 2, wherein the phosphor raw material comprises a compound represented by formula (1) in which e is zero and a compound (2) containing at least one atom selected from the group consisting of Eu, Tb, In, Ce, Tm, Dy, Pr, Ho, Nd, Yb, Er, Gd, Lu, Sm, Y, Tl, Na, Ag, Cu and Mg.

5. The method of claim 4, wherein the compound represented by formula (1) is at least one selected from the group consisting of NaF, NaCl, NaBr, NaI, KF, KCl, KBr, KI, RbF, RbCl, RbBr, RbI, CsF, CsCl, CsBr and CsI.

6. The method of claim 4, wherein the compound represented by formula (1) is at least one selected from the group consisting of $MgF_2$, $MgCl_2$, $MgBr_2$, $MgI_2$, $CaF_2$, $CaCl_2$, $CaBr_2$, $CaI_2$, $SrF_2$, $SrCl_2$, $SrBr_2$, $SrI_2$, $BaF_2$, $BaCl_2$, $BaBr_2$, $BaBr_2.2H_2O$, $BaI_2$, $ZnF_2$, $ZnCl_2$, $ZnBr_2$, $ZnI_2$, $CdF_2$, $CdCl_2$, $CdBr_2$, $CdI_2$, $CuF_2$, $CuCl_2$, $CuBr_2$, $CuI_2$, $NiF_2$, $NiCl2$, $NiBr_2$ and $NiI_2$.

7. The method of claim 4, wherein the compound (2) is at least one selected from the group consisting of $EuX_2$, $EuX_3$ and EuOX in which X is F, Cl, Br or I.

8. The method of claim 4, wherein the compound (2) is at least one selected from the group consisting of $EuBr_3$, $EuBr_2$, $EuCl_2$ and EuOBr.

9. The method of claim 2, wherein the phosphor layer has a molar ratio of A to $M^1$ of $1 \times 10^{-5}$ to $1 \times 10^{-3}$.

10. The method of claim 1, wherein the substrate is a resin film selected from the group consisting of a cellulose acetate film, a polyester film, a polyamide film, a polyimide film and a polycarbonate film.

* * * * *